United States Patent
Ohkubo et al.

(10) Patent No.: US 7,636,287 B2
(45) Date of Patent: Dec. 22, 2009

(54) REPRODUCED SIGNAL EQUALIZING METHOD FOR OPTICAL INFORMATION MEDIA AND OPTICAL INFORMATION REPRODUCING/RECORDING APPARATUS

(75) Inventors: Shuichi Ohkubo, Tokyo (JP); Hiromi Honma, Tokyo (JP); Masatsugu Ogawa, Tokyo (JP); Masaki Nakano, Tokyo (JP); Toshiaki Iwanaga, Tokyo (JP); Yutaka Kashihara, Tokyo (JP); Yuji Nagai, Tokyo (JP); Akihito Ogawa, Tokyo (JP)

(73) Assignees: NEC Corporation (JP); Kabushiki Kaisha Toshiba (JP)

( * ) Notice: Subject to any disclaimer, the term of this patent is extended or adjusted under 35 U.S.C. 154(b) by 396 days.

(21) Appl. No.: 10/822,374

(22) Filed: Apr. 12, 2004

(65) Prior Publication Data

US 2004/0257954 A1 Dec. 23, 2004

(30) Foreign Application Priority Data

Apr. 11, 2003 (JP) ............................. 2003-108138
Apr. 1, 2004 (JP) ............................. 2004-109006

(51) Int. Cl.
G11B 7/005 (2006.01)
G11B 7/00 (2006.01)

(52) U.S. Cl. ................................. 369/59.22; 369/47.18

(58) Field of Classification Search ... 369/59.21–59.24, 369/47.5–47.53, 47.17–47.18; 360/39, 46, 360/67; 375/316, 325, 340–341
See application file for complete search history.

(56) References Cited

U.S. PATENT DOCUMENTS

| 5,892,632 A | * | 4/1999 | Behrens et al. ............... 360/51 |
|---|---|---|---|
| 6,198,587 B1 | | 3/2001 | Hayashi ........................ 360/65 |
| 6,449,110 B1 | | 9/2002 | DeGroat et al. ............... 360/46 |
| 6,504,868 B1 | * | 1/2003 | Koizumi ...................... 375/341 |
| 2002/0012185 A1 | | 1/2002 | Sawaguchi et al. ............ 360/46 |
| 2002/0064108 A1 | * | 5/2002 | Miyashita et al. ........ 369/47.35 |
| 2002/0067670 A1 | * | 6/2002 | Akiyama et al. ......... 369/47.52 |
| 2002/0131486 A1 | * | 9/2002 | Haartsen ..................... 375/229 |
| 2002/0154434 A1 | | 10/2002 | Satoh et al. .................... 360/65 |
| 2003/0002407 A1 | * | 1/2003 | Fujiwara ..................... 369/47.5 |
| 2003/0081668 A1 | * | 5/2003 | Yousef et al. ............... 375/232 |

FOREIGN PATENT DOCUMENTS

EP 1 160 785 12/2001

(Continued)

OTHER PUBLICATIONS

Machine Assisted Translation and English abstract of JP 08-037478, published Feb. 6, 1996.*

(Continued)

*Primary Examiner*—Andrea L Wellington
*Assistant Examiner*—Nathan Danielsen
(74) *Attorney, Agent, or Firm*—Hayes Soloway P.C.

(57) ABSTRACT

Reproduced signals are equalized by the least square technique by using a predetermined number of data samples binarized by a Viterbi decoder. Even when data written on an optical disk is unknown, the data can be equalized in a stable manner and can be reproduced at a low error rate without instability factors such as divergence due to interference.

3 Claims, 5 Drawing Sheets

FOREIGN PATENT DOCUMENTS

| | | |
|---|---|---|
| JP | 8-37478 | 2/1996 |
| JP | 09-259543 | 3/1997 |
| JP | 2001-14804 | 1/2001 |
| JP | 2001-126260 | 5/2001 |
| JP | 2001-202627 | 7/2001 |
| JP | 2002-230904 | 8/2002 |
| JP | 2003-085764 | 3/2003 |
| WO | WO 00/22620 | 4/2000 |

OTHER PUBLICATIONS

Heikin et al., "Adaptive Filter Manual", Modern Technology Company, Oct. 1990, 2nd Edition, pp. 131-135.

"A New Method to Evaluate Quality for Systems to which PRML is Applied", Nagai et al., Optical Memory and Optical Data Storage Topical Meeting, 2002, pp. 365-367.

"Optimization of Write Strategy in a PRML System for High Density Recording", Ohkubo et al., Optical Memory and Optical Data Storage Topical Meeting, 2002, pp. 425-427.

* cited by examiner

REPRODUCED SIGNAL EQUALIZING METHOD FOR OPTICAL INFORMATION MEDIA AND OPTICAL INFORMATION REPRODUCING/RECORDING APPARATUS

BACKGROUND OF THE INVENTION

1. Field of the Invention

The present invention relates to a method for equalizing reproduced signals obtained by irradiating laser light to an optical information recording medium and relates to an optical information reproducing apparatus having a function for equalizing reproduced signals. In particular, the present invention relates to a reproduced signal equalizing method for optical information media and an optical information reproducing/recording apparatus for reproduced signals having a partial response waveform as a target waveform for equalization. Furthermore, the present invention relates to evaluating and adjusting methods for evaluating the quality of reproduced signals by using reproduced signals equalized by the equalizing method and for adjusting writing conditions based on the evaluation result.

2. Description of the Related Art

Generally, in reproducing information recorded in high density, a data signal recorded at a predetermined position on a recording medium is influenced by data signals recorded before and after the data signal. Then, inter-code interference may occur in which a reproduced signal varies from the waveform intended when the reproduced signal is written. As a result, an error may easily occur while decoding the signal, which is a problem.

In order to solve the problem, equalization is performed which can reduce the inter-code interference as much as possible in a conventional optical disk apparatus such as a digital versatile disk (DVD). However, when the data recorded in much higher density is equalized by this method, a noise component may be emphasized. Thus, the improvement in detection performance may be limited under a certain level.

A data detecting method called Partial Response Maximum Likelihood (PRML) is known as a reproducing method which can further increase the density by using a conventional equalizing method. In PRML, reproduced signals are equalized to a predetermined partial response (may be abbreviated as PR, hereinafter) waveform having inter-code interference. The influence of the inter-code interference is considered based on an algorithm called Viterbi decoding to perform data identification. Some kinds of inter-code interference regulated in partial responses equalize waveforms having inter-code interference to acceptable waveforms. Thus, the noise increase due to equalization can be suppressed. Since the influence by the inter-code interference is considered by Viterbi decoding, a higher recording density can be achieved.

Figure 3:
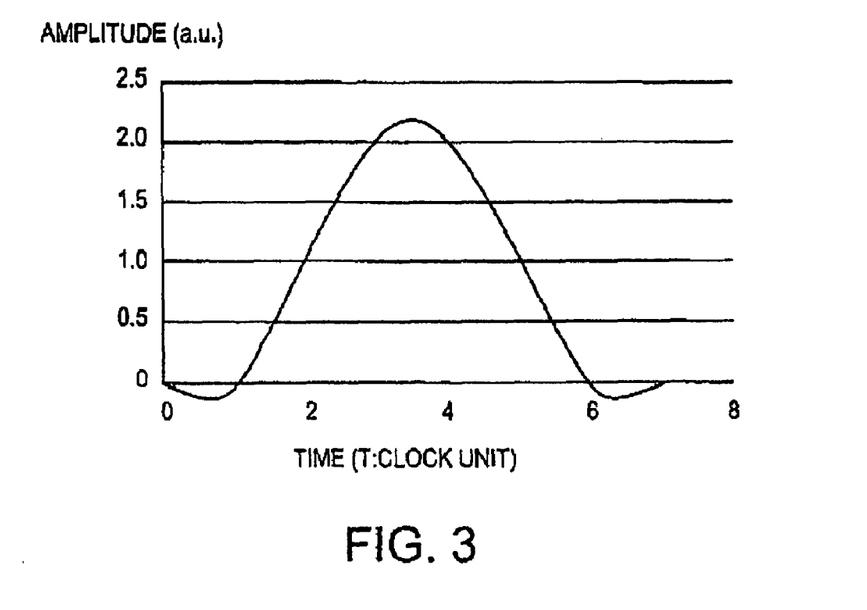
FIG. 3 is a diagram illustrating a partial response waveform.

A time length (time T in clock unit in FIG. 3) in bit rate having a non-zero (0) value in a partial response waveform is generally called constraint length. FIG. 3 shows a partial response waveform having constraint length as a waveform example. A longer constraint length means a reproduced waveform having higher inter-code interference. When data is recorded in high density, the signals to be actually read have high inter-code interference. Therefore, a partial response waveform having a longer constraint length is selected. As a result, due to the linear superimposition (superimposition computing) of partial response waveforms, reproduced signals can be obtained which are close to the actual reproduced signals. When the actual reproduced waveform is less different from the waveform represented by the superimposition computing of the partial response waveform, the noise amplification due to equalization can be suppressed.

However, in the conventional reproduced signal equalizing method, waveforms may not be equalized to a waveform sufficiently close to a target waveform. In other words, when waveforms cannot be equalized to a predetermined partial response waveform, a higher error rate occurs in a Viterbi detector during the decoding. Therefore, binary discrimination of information becomes harder, and the error rate is deteriorated, which is another problem.

This is due to changes in reproduced signals. In order to equalize reproduced signals to a partial response waveform, a finite impulse response (FIR) filter is used which generally includes about 5 to 20 taps. A change in tap coefficient of the filter changes the equalized signal. Here, equalization can be performed by using a predetermined and fixed tap coefficient. However, the reproduced signals even with the same recording density depend on the beam diameter of an optical head for reproducing, the inclination of an optical information medium and/or the like.

A technology called adaptive equalization is known as one technique for changing the tap coefficient in accordance with the change in reproduced signals. In adaptive equalization, a properly predetermined tap coefficient is used as an initial value. Then, the tap coefficient is changed gradually such that the difference between an equalized waveform and a target waveform based on the initial value can be the smallest in the shortest time. By performing convergence calculations with different tap coefficients, the most suitable tap coefficient is obtained. Advantageously, equalization can be performed even when data recorded in information is not known in this technique. However, equalization is susceptible to noise, for example, and the convergence calculations do not converge but diverge, which is a problem. Especially, when the recording density is high and when the signal quality of reproduced signals is low, the problem becomes more significant.

SUMMARY OF THE INVENTION

In order to solve the problems, it is an object of the invention to provide an equalizing method for equalizing reproduced signals of optical information recorded at high density to a partial response waveform in a stable manner even with variations in the reproducing condition such as the tilt and the beam diameter and even under the influence of interference such as noise.

Also, in order to solve the problems, it is another object of the invention to provide a method for equalizing reproduced signals obtained by irradiating laser light to an optical information medium such that the waveforms are close to a waveform having a predetermined characteristic.

According to one aspect of the invention, there is provided a reproduced signal equalizing method including the steps of sampling reproduced signals in a predetermined cycle, calculating an equalization coefficient for producing a smallest difference between a target waveform and an equalized waveform by the least square technique by using a predetermined number or more of sampled waveform data, and equalizing reproduced signals by using the calculated equalization coefficient.

The number of the sampled waveform data is desirably 3000 or more. The reproduced signal equalizing method may further include the steps of inputting the reproduced signals sampled in the predetermined cycle to a Viterbi decoder, and defining a target waveform as a waveform resulting from equalization of the reproduced signals based on binarized data demodulated by the Viterbi decoder and the partial response waveforms. In particular, a partial response value (1,2,2,2,1) is desirably used as the target partial response waveform.

According to another aspect of the invention, there is provided an optical information reproducing apparatus having a function for equalizing reproduced signals by using the reproduced signal equalizing method.

According to another aspect of the invention, there is provided a signal quality evaluating method, including the steps of equalizing reproduced signals by using the reproduced signal equalizing method, and evaluating quality of the reproduced signals from the equalized reproduced signals and binary identification data.

According to another aspect of the invention, there is provided a writing condition adjusting method, wherein a writing condition is adjusted based on an evaluation result of the signal quality evaluation method.

Hence, even when information recorded on an optical disk is unknown, the reproduced signals can be equalized precisely to a predetermined partial response waveform without instability factors such as divergence. Furthermore, information recorded at high density can be reproduced at a lower error rate.

Therefore, the invention can be used for reproducing/recording applications for obtaining reproduced signals in high quality from a recording medium having a very high recording density.

DESCRIPTION OF THE PREFERRFED EMBODIMENTS

In order to achieve the objects, an equalizing method for equalizing reproduced signals to a partial response waveform in a stable manner includes the steps of sampling reproduced signals in a predetermined cycle, calculating an equalization coefficient for producing the smallest difference between a target waveform and an equalized waveform by the least square technique by using a predetermined number or more of sampled waveform data, and equalizing the reproduced signals by using the calculated equalization coefficient.

Figure 1:
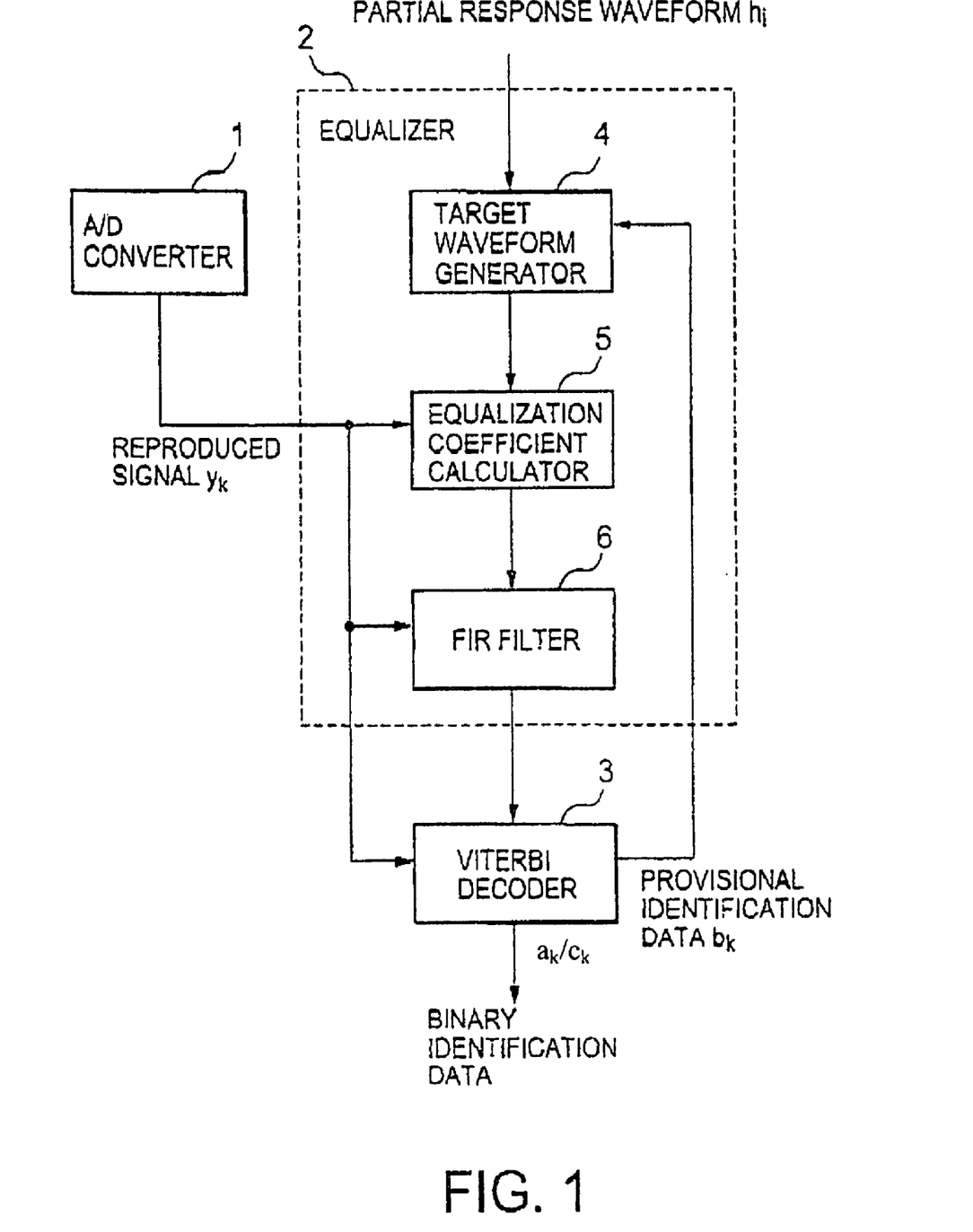
FIG. 1 is a diagram showing a form of a functional configuration of an optical information reproducing apparatus, especially, an equalizer according to the invention.
Figure 2:
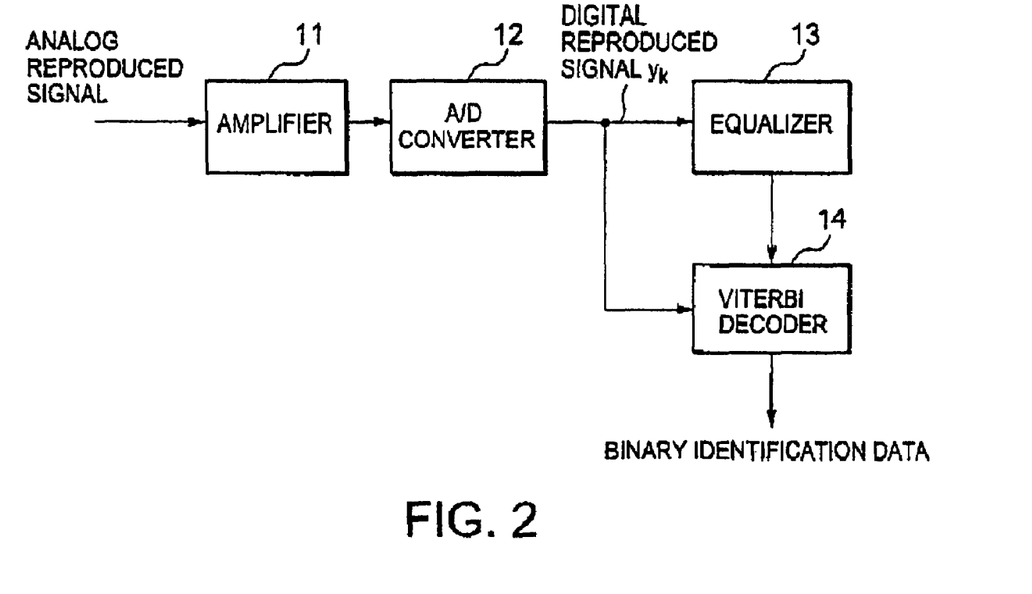
FIG. 2 is a diagram showing a form of a functional configuration of an optical information reproducing apparatus according to the invention.

Now, embodiments according to the present invention will be described with reference to drawings, FIG. 1 is an explanatory diagram showing a form of a functional configuration of an optical information reproducing apparatus, especially, an equalizer according to the present invention. FIG. 2 is an explanatory diagram showing a form of a configuration example of an optical information reproducing apparatus according to the present invention.

In an optical information reproducing apparatus shown in FIG. 2, signals recorded on an optical information medium, that is, an optical disk (not shown) are read as analog signals through an optical head device (not shown). The analog signals are amplified to analog reproduced signals having a sufficiently large amplitude by an amplifier 11. Then, the analog reproduced signals are digitally converted by an analog/digital (A/D) converter 12. The digitally converted reproduced signals are output as digital reproduced signals $y_k$ at bit rate, that is, in clock time by a phase-locked loop (PLL) circuit. Then, the reproduced signals $y_k$ are input to an equalizer 13. The reproduced signals $y_k$ are equalized to a predetermined PR waveform by the equalizer 13 and are input to a Viterbi decoder 14. The Viterbi decoder 14 binarizes the data by the Viterbi algorithm.

The target waveform of the equalization is "$\Sigma a_{k-1} * h_i$" where a partial response waveform at bit rate (that is, in clock time) is "$h_i$" (an index i of which corresponds to a time) and binary data recorded on the optical disk is "$a_k$". In the equation, a sum about the index "i" depends on the constraint length of the partial response. For example, the sum of "i" may be "1 to 5" for the partial response wavelength with constraint length 5.

According to the present invention, a tap coefficient, "$W_i$", of an equalizer having the smallest result of an equation $\epsilon = \Sigma(\Sigma y_{k-1} * W_i - \Sigma a_{k-i} * h_i)^2$ is obtained by the least square technique. In other words, "$W_i$" is calculated by calculating a variation $\delta_\epsilon$ for "$w_i$" about "$\epsilon$" and solving an equation to be "$\delta_\epsilon = 0$". According to the invention, the problems including divergence do not occur since no convergence calculation is required.

The equation to be "$\delta_\epsilon = 0$" is concluded in a following linear equation. The equalization coefficient $W_i$ (corresponding to an element of a determinant W) can be obtained by calculating a determinant "$W = C^{-1} D$" including the determinant W represented by a tap coefficient to be calculated, a determinant C represented by using a correlation of actually reproduced signals as an element and a determinant D represented by using a correlation between reproduced signals and an equalization target signal as an element. Here, the elements, "C" and "D", are defined as equations (1) and (2):

$$C = \begin{bmatrix} c(0) & c(1) & . & . & c(N-1) \\ c(-1) & c(0) & . & . & c(N-2) \\ . & . & . & . & . \\ . & . & . & . & . \\ c(-N+1) & c(=N+2) & . & . & c(0) \end{bmatrix} \quad (1)$$

where $$c(m) = \sum_{k=N-m}^{M-m} y(k)\, y(k+m),\ 0 \geq m,\ c(-m),\ 0 < m$$

$$D = [d(0) d(1) \ldots d(N-1)] \quad (2)$$

where $$d(i) = \sum_{k=N-i}^{M-i} y(k-i) z(k), \ 0 \leq i \leq N-1, \ z(k) = \sum_j a_{k-j} h_j.$$

Herein, "N" is the number of taps of a FIR filter for performing a partial response, and "M" is the number of reproduced signal samples used for determining the tap coefficient.

According to the invention, unlike adaptive equalization, information recorded on an optical disk must be known in advance. However, it is difficult to know data previously recorded on an optical disk such as a read-only memory (ROM). The inventors found that even data resulting from the direct binarization of unequalized waveforms by using a Viterbi decoder could be equalized more precisely with a predetermined number of samples.

Before describing examples thereof, a configuration of an equalizer 2 will be described with reference to FIG. 1. Here, the equalizer 2 receives and equalizes the digital reproduced signals $y_k$ from an A/D converter 1. Then, the equalizer 2 outputs the result to a Viterbi decoder 3.

The equalizer 2 includes a target waveform generator 4, an equalization coefficient calculator 5, and a finite impulse response (FIR) filter 6. The target waveform generator 4 receives the feedback of provisional identification data $b_k$ output from the Viterbi decoder 3 and generates a target waveform from a partial response waveform h; to be equalized. Then, the target waveform generator 4 sends the target waveform to the equalization coefficient calculator 5. The equalization coefficient calculator 5 receives the target waveform and also receives the reproduced signals $y_k$ from the A/D converter 1. Then, the equalization coefficient calculator 5 calculates an equalization coefficient and sends the equalization coefficient to the FIR filter 6. The FIR filter 6 changes multiple kinds of taps and adjusts the equalization, as described above.

Next, Examples 1 to 5 of the embodiments will be specifically described with reference to drawings.

EXAMPLE 1

Example 1 according to this embodiment of the invention will be described with reference to FIG. 1.

In Example 1, a phase-change optical disk was used to perform a recording/reproducing evaluation.

The phase-change optical disk was provided on a polycarbonate substrate 0.6 mm thick. The pitch of a guide slot on the substrate was 0.68 μm. Data $a_k$ modulated by (1-7) modulation method was written thereon and then was read by using an optical head having a wavelength of 405 nm and an objective lens with an NA of 0.65 under a condition with a linear speed of 5.6 m/s and a clock frequency of 64.6 MHz. The recording density was 0.13 μm/bit. In Example 1, as shown in FIG. 1, equalization by the least square technique used provisional binary data $b_k$ obtained by directly inputting unequalized reproduced signals $y_k$ for each clock time to the Viterbi decoder 3. In Example 1, the target partial response waveform had a PR value (1,2,2,2,1).

The partial response equalization was performed with the different numbers of samples of the reproduced signal $y_k$ to be used for the least square technique. Then, the binary data "$c_k$", $_{and}$ "$a_k$" demodulated by the Viterbi decoder 3 were compared, and the bit error rate was finally calculated. The FIR filter 6 having 9 taps was used for equalization. $10^6$ samples were used for calculating the error rate. However, for example, when the first 100 reproduced signal samples of the $10^6$ samples were used to calculate an equalization coefficient by the least square technique, all of the $10^6$ reproduced signal samples were equalized with the equalization coefficient. Then, the signals were input by the Viterbi decoder 3, and "$c_k$" of the binary data was calculated.

Figure 4:
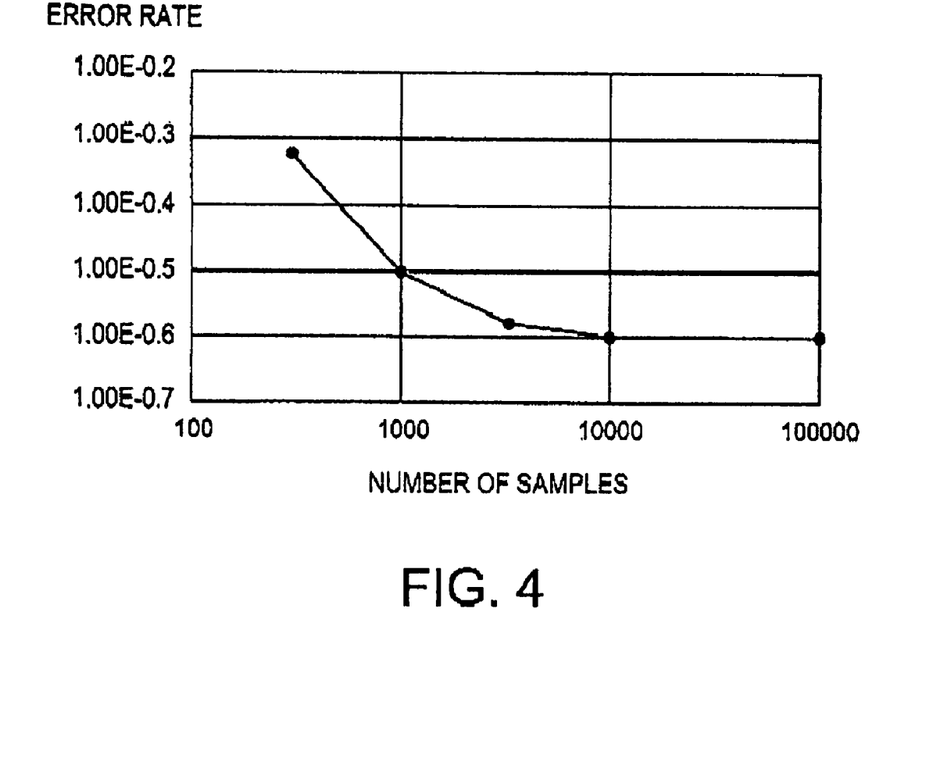
FIG. 4 is a diagram showing a relationship between the number of reproduced signal samples and final error rates with respect to a phase change optical disk.

FIG. 4 shows a relationship between the number of samples and the finally obtained bit error rate. As shown in FIG. 4, with 3000 or more samples, information can be read at a lower error rate. Since the error rate stays almost the same with 3000 or more samples, 3000 samples are enough.

Furthermore, the error rate is improved to some extent when the number of samples for calculating the equalizing efficient is increased from 3000. However, the error rate stays the same even when the number of samples is increased to 10000 or more. Therefore, 10000 samples are enough at most.

EXAMPLE 2

Example 2 according to this embodiment of the invention will be described with reference to FIG. 2.

In Example 2, a ROM disk was used to perform a recording/reproducing evaluation.

The ROM disk was provided on a polycarbonate substrate 0.6 mm thick. Known data $a_k$ was formed on the substrate. Here, the radial pitch of the pit was 0.4 μm and the pitch in the laser scanning direction was 0.2 μm. Since the (1-7) modulation method was used to form the pit, the linear density was 0.15 μm/bit. By using an optical head having a waveform of 405 nm and an objective lens with a NA of 0.65, a reproducing evaluation was performed at a linear speed of 6.6 m/s. Also in this example, like Example 1 and as shown in FIG. 3, equalization by the least square technique used provisional binary data $b_k$ obtained by directly inputting reproduced signals $y_k$ in clock time to the Viterbi decoder 3. The FIR filter 6 with 9 taps was used for equalization, and the target partial response waveform was the PR value (1,2,2,2,1).

The partial response equalization was performed with the different numbers of samples of the reproduced signal $y_k$ to be used for the least square technique. Then, the binary data "$c_k$" and "$a_k$" demodulated by the Viterbi decoder 3 were compared, and the bit error rate was finally calculated. $10^6$ samples were used for calculating the error rate. However, for example, when the first 100 reproduced signal samples of the $10^6$ samples were used to calculate an equalization coefficient by the least square technique, all of the $10^6$ reproduced signal samples were equalized with the equalization coefficient. Then, the signals were input by the Viterbi decoder 3, and "$c_k$" of the binary data was calculated.

Figure 5:
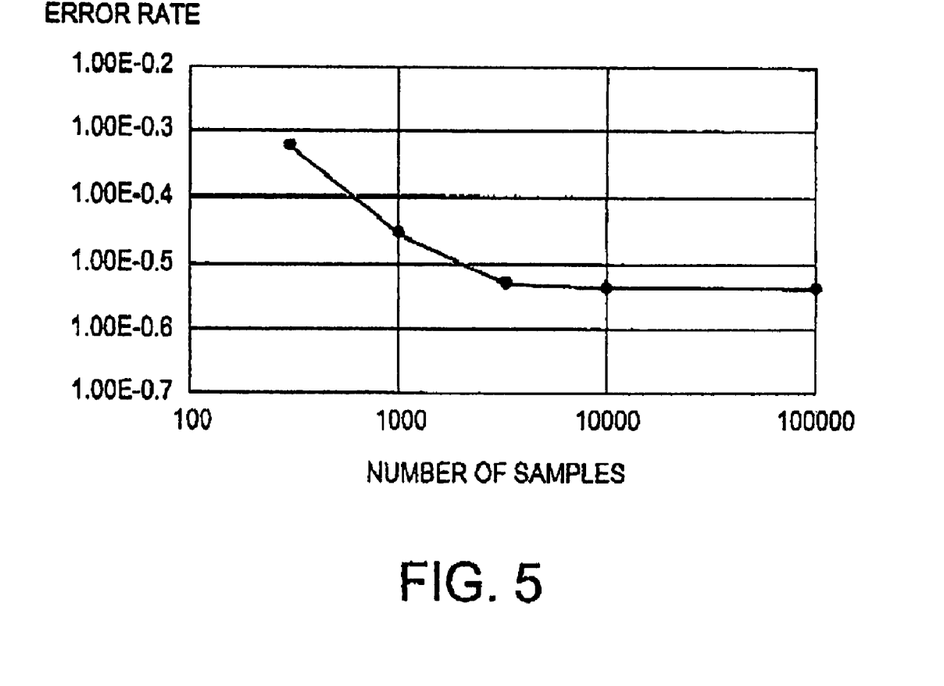
FIG. 5 is a diagram showing a relationship between the number of reproduced signal samples and final error rates with respect to a reproduction-only optical disk.

FIG. 5 shows a relationship between the number of samples and the finally obtained bit error rate. Though the recording density in Example 2 is different from that of Example 1, information can be read at a lower error rate with 3000 or more samples like Example 1. Since the error rate stays the same with 3000 or more samples, 3000 samples are enough.

EXAMPLE 3

In Example 1 and Example 2, the provisional binary data $b_k$ was calculated by inputting sampled reproduced signals to the Viterbi decoder 3 without equalization of the reproduced signals. However, the provisional binary data may be calculated by inputting signals equalized with a proper predetermined equalization coefficient to the Viterbi decoder 3.

In other words, reproduced signals are filtered (equalized) by using a fixed coefficient as an initial equalization coefficient of an FIR filter. Then, a provisional identification signal $b_k$ is generated from the equalized signals by using the Viterbi decoder 3. Next, like Examples 1 and 2, from the provisional identification data and a reproduced signal $y_k$, the target waveform generator 4 and the equalization coefficient calculator 5 calculate an equalization coefficient of the FIR filter. The initial equalization coefficient can be experimentally calculated by using the same optical head and optical disk as those of a real drive product, for example, and can be stored in a predetermined area of a recording medium. The initial equalization coefficient W(iT) (where i=−4, −3, −2, −1, 0, 1, 2, 3, 4) may be:

as Example 1 of the initial equalization coefficient,
W(−4T)=W(4T)=0.0259,
W(−3T)=W(3T)=0.1023,
W(−2T)=W(2T)=0.1276,
W(−T)=W(T)=0.1001, or
W(0T)=0.6974, and as Example 2 of the initial equalization coefficient,
W(−4T)=W(4T)=0.1634,
W(−3T)=W(3T)=−0.0903,
W(−2T)=W(2T)=−0.2099,
W(−T)=W(T)=0.0968, or
W(0T)=1.0800.

In Example 3, the equalizer 2 having a previously fixed equalization coefficient may be provided between the reproduced signals $y_k$ and the Viterbi decoder 3 in FIG. 1. Alternatively, a fixed equalization coefficient to be defined in the FIR filter 6 in FIG. 1 may be supplied from a memory, for example.

The equalization coefficient may be recalculated when the reproducing condition is changed after the equalizationl coefficient is calculated at a certain time. In this case, the equalization coefficient obtained in Examples 1 or 2 or the equalization coefficient obtained by using the initial equalization coefficient in Example 3 is stored in a memory in advance, for example. In order to recalculate the equalization coefficient, the reproduced signal equalized by the stored previous equalization coefficient may be input to the Viterbi decoder 3, and provisional binary discrimination data may be calculated. Thus, a target equalized waveform may be obtained.

By using the same phase-change optical disk and optical head as those of Example 1, previously written information was reproduced with different kinds of defocusing. Under different defocusing conditions, equalization coefficients were calculated, and the reproduced signals were equalized. Then, the error rate was measured. In Example 3, the reproduced signals equalized by using the tap coefficient calculated in Example 1 (which is the same under different defocusing conditions) were input to the Viterbi decoder 3. Then, a target waveform was calculated based on the provisional binary discrimination data, and the final equalization coefficient was obtained. In this example, the number of taps in the FIR filter 6 for equalization is also "9".

Figure 6:
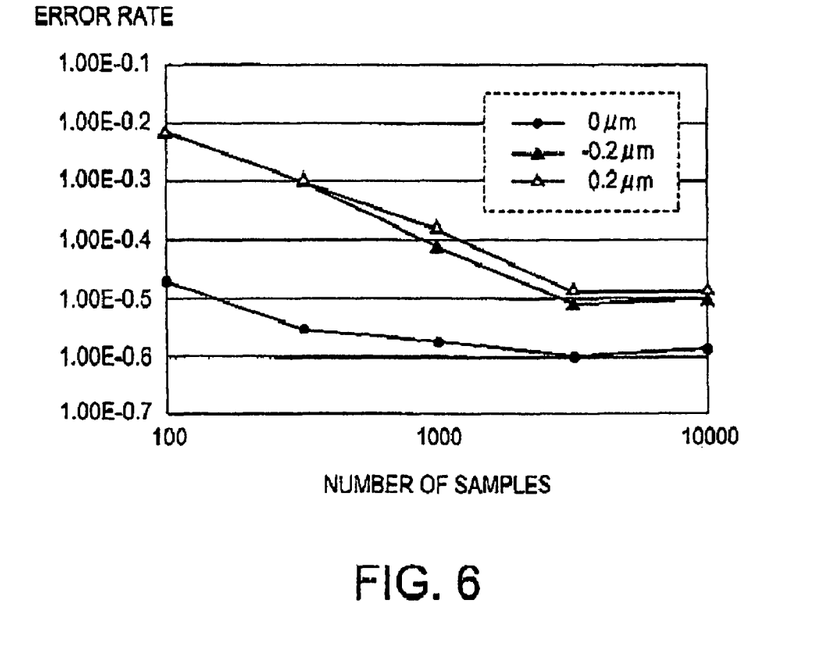
FIG. 6 is a diagram showing a relationship between the number of reproduced signal samples and final error rates in a case where the defocusing is changed.

FIG. 6 shows a relationship between the number of samples used for equalization and the error rates under different defocusing conditions. Since the condition, the defocusing amount 0 μm, is substantially the same as that of Example 1, signals can be reproduced at a lower error rate by using the coefficient calculated by the least square technique with a smaller number of samples. The error rate is deteriorated with a very small number of samples such as about 100 samples because, even under the same reproducing condition, the effect of random noise is not completely the same and the error rate may be influenced thereby.

Like Examples 1 and 2, as shown in FIG. 6, signals can be reproduced at a lower error rate with about 3000 samples, when the defocusing amount is ±0.2 μm. The error rate is more deteriorated with the defocusing amount of ±0.2 μm than that with the defocusing amount of 0 μm not because of the precision of the calculation of equalization coefficients but because the reproducing performance itself is deteriorated due to the defocusing.

In the examples above, the number of taps of the FIR filter 6 was "9", but the fact was found that the equalization errors were almost the same with "7 or more" taps in order to equalize to the PR value (1.2,2,2, 1) of constraint length 5. That is, "7 or more" taps are enough. However, an excessive number of taps may increase the size of calculations by the least square technique or the size of the circuit or may decrease the operational speed. Therefore, about 7 to 15 taps are desirable.

EXAMPLE 4

Figure 7:
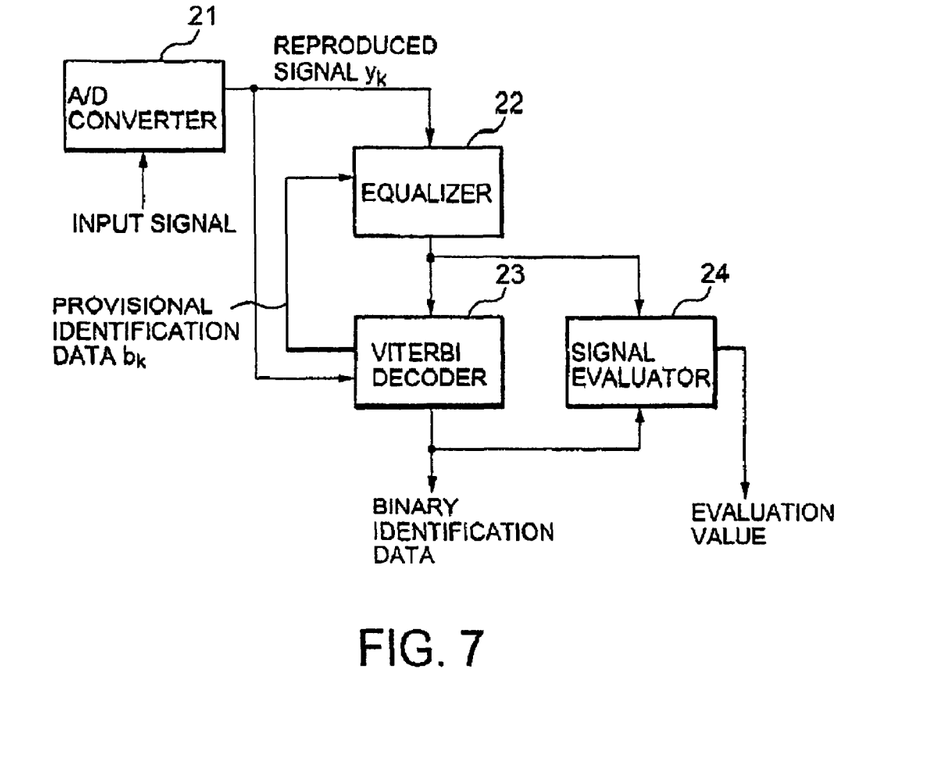
FIG. 7 is a diagram illustrating a form of a functional configuration of an optical information reproducing apparatus according to Example 4 of the invention.

FIG. 7 is a diagram showing a configuration of an optical-information reproducing/recording apparatus according to Example 4 of the invention. A shown equalizer 22 is the same as the equalizers in Examples 1 to 3. A tap coefficient of the equalizer 22 can be calculated by following the steps in Examples 1 to 3. Subsequently, reproduced signals are equalized by using the tap coefficient, and binary identification data is obtained by a Viterbi decoder 23 from the equalized reproduced signal. Finally, the quality of the reproduced signals is evaluated by a signal evaluator 24 from the equalized reproduced signal and the binary identification data.

EXAMPLE 5

Figure 8:
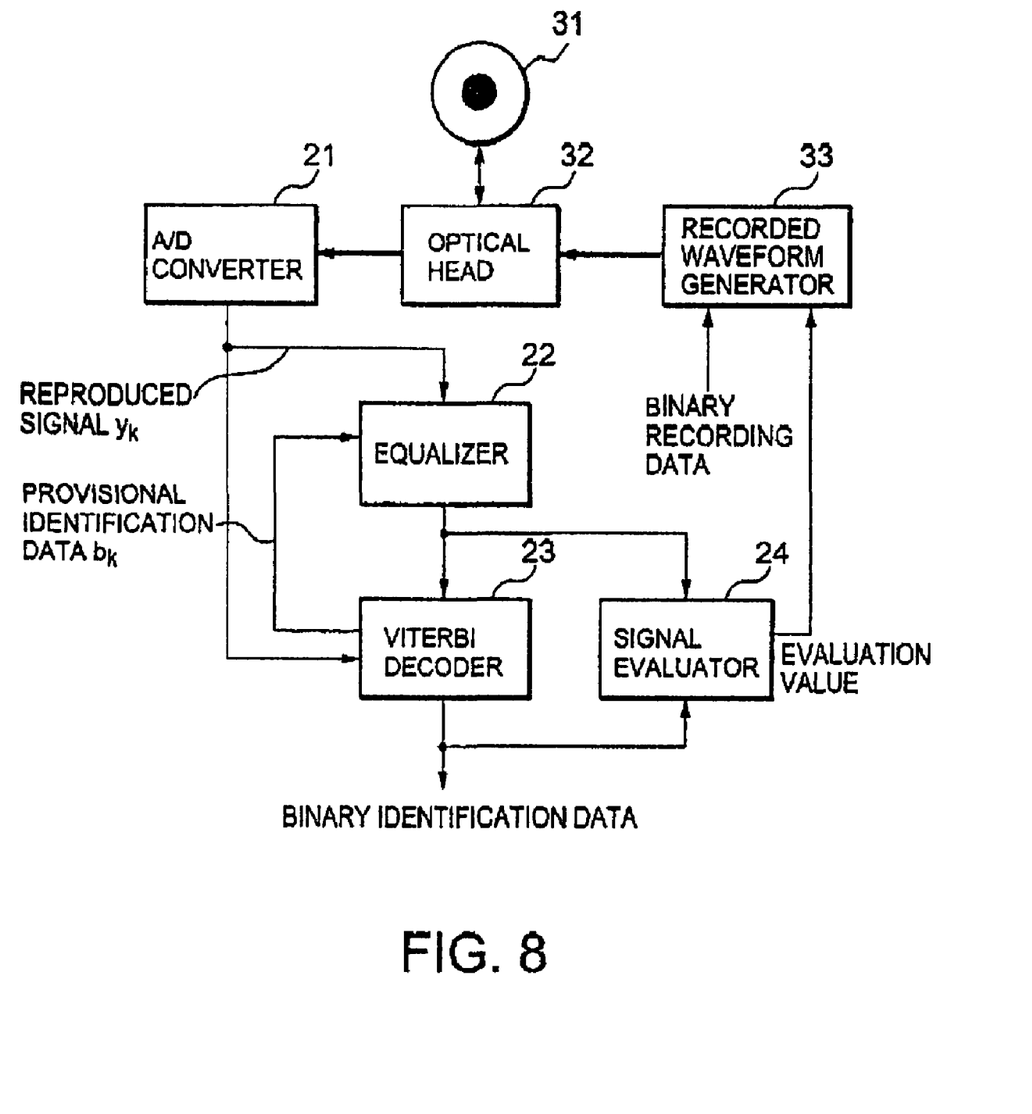
FIG. 8 is a diagram illustrating a form of a functional construction of an optical information reproducing/recording apparatus according to Example 5 of the invention.

FIG. 8 is a diagram showing a configuration of an optical-information reproducing/recording apparatus according to Example 5 of the invention. In FIG. 8, the equalizer 22 is the same as the equalizer of Examples 1 to 3. An initial set value for generating recorded waveforms is stored in an internal memory of a recorded waveform generator 33. Here, a recorded waveform represents a time variation (the parameters of which are a power and a pulse width) of laser light being irradiated onto an optical disk while writing data, which is generally called recording strategy. The initial set value is recorded on an optical disk 31 in advance. After reproducing the initial set value from the applicable area, the initial set value may be stored in the internal memory.

First of all, the recorded waveform generator 33 generates an initial recorded waveform from binary recorded data based on the initial set value of the recorded waveform. Information is written on the optical disk 31 through the optical head 32 by using the initial recorded waveform. The written information is read out as reproduced signals through the optical head 32 and is converted to digital data by the A/D converter 21. From the reproduced signals, a tap coefficient of the equalizer 22 is obtained by following the steps in Examples 1 to 3. Again, the reproduced signals are read out from the information, and the reproduced signals are equalized by using the tap coefficient. From the equalized reproduced signal, binary identification data is obtained by the Viterbi decoder 23. From the equalized reproduced signal and the binary identification data, a quality evaluation value of the reproduced signals is calculated by the signal evaluator 24. Based on the calculated quality evaluation value, the recorded waveform set value stored in the internal memory of the recorded waveform generator 33 is corrected.

The set value of the recorded waveform can repeatedly be corrected. That is, based on the recorded waveform set value corrected, the recorded waveform is generated from binary recorded data. After that, according to the steps as described above, the quality evaluation value of the reproduced signals is calculated. And based on the calculated quality evaluation value, the recorded waveform set value stored in the internal memory of the recorded waveform generator 33 is corrected.

In the case that the set value of the recorded waveform can repeatedly be corrected, the tap coefficient obtained at the first time may be used for calculation on and after the second. As the result, since the calculation time on and after the second for the tap coefficient is omitted, the correction of the set value of the recorded waveform is performed at high speed.

What is claimed is:

1. A reproduced signal equalizing method for optical information media in which reproduced signals obtained by irradiating laser light to an optical information medium are equalized so as to bring a waveform corresponding to the reproduced signals close to a waveform having predetermined characteristics, the method comprising the steps of:
    sampling the reproduced signals in a predetermined cycle;
    inputting the reproduced signals sampled in the predetermined cycle to a Viterbi decoder, wherein the reproduced signals sampled in the predetermined cycle are unequalized;
    demodulating by the Viterbi decoder the unequalized reproduced signals sampled in the predetermined cycle to generate binarized data;
    defining a target waveform as a waveform based on the binarized data demodulated by the Viterbi decoder and a partial response waveform;
    calculating an equalization coefficient for producing a smallest difference between the target waveform and the unequalized reproduced signals sampled in the predetermined cycle by a least square technique using a matrix calculation; and
    equalizing the unequalized reproduced signals sampled in the predetermined cycle by using the calculated equalization coefficient.

2. The reproduced signal equalizing method according to claim 1, wherein 3000 or more sampled waveforms are used in the matrix calculation.

3. A reproduced signal equalizing apparatus for equalizing reproduced signals obtained from optical information media by bringing a waveform corresponding to the reproduced signals close to a waveform having predetermined characteristics, the reproduced signal equalizing apparatus comprising:
    an optical head which reproduces signals by irradiating laser light to an optical information medium;
    an analog-to-digital (A/D) converter which samples the reproduced signals in a predetermined cycle;
    a Viterbi decoder which demodulates the reproduced signals sampled in the predetermined cycle to generate binarized data, wherein the reproduced signals sampled in the predetermined cycle are unequalized;
    a target waveform generator which generates a target waveform based on the binarized data demodulated by the Viterbi decoder and a partial response waveform;
    an equalization coefficient calculator which calculates an equalization coefficient by producing a smallest difference between the target waveform and the unequalized reproduced signals sampled in the predetermined cycle using a least square technique, wherein the least square technique includes including a matrix calculation; and
    an equalizer which equalizes the unequalized reproduced signals sampled in the predetermined cycle by using the calculated equalization coefficient.

* * * * *

UNITED STATES PATENT AND TRADEMARK OFFICE
CERTIFICATE OF CORRECTION

PATENT NO. : 7,636,287 B2
APPLICATION NO. : 10/822374
DATED : December 22, 2009
INVENTOR(S) : Ohkubo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Ninth Day of November, 2010

David J. Kappos
*Director of the United States Patent and Trademark Office*